United States Patent [19]
Reese et al.

[11] Patent Number: 5,178,093
[45] Date of Patent: Jan. 12, 1993

[54] AQUACULTURE SYSTEM

[75] Inventors: Kenneth Reese; Dennis Rustad; Curtis Reese, all of Hancock, Minn.

[73] Assignee: Glacial Hills, Inc., Hancock, Minn.

[21] Appl. No.: 910,862

[22] Filed: Jul. 8, 1992

[51] Int. Cl.$^5$ ............................................. A01K 63/04
[52] U.S. Cl. ............................................. 119/3; 119/5
[58] Field of Search ............................... 119/2, 3, 4, 5; 210/616, 618, 150, 169, 242.1, 242.4, 924

[56] References Cited

U.S. PATENT DOCUMENTS

| | | | |
|---|---|---|---|
| 4,028,245 | 6/1977 | Stahler | 119/3 |
| 4,030,450 | 6/1977 | Hoult | 119/3 |
| 4,052,960 | 10/1977 | Birkbeck et al. | 119/3 |
| 4,187,187 | 2/1980 | Turbeville | 210/242.4 |
| 5,081,954 | 1/1992 | Monns | 119/3 |

FOREIGN PATENT DOCUMENTS 2016882 9/1979 United Kingdom ................... 119/3

Primary Examiner—John G. Weiss
Attorney, Agent, or Firm—Haugen and Nikolai

[57] ABSTRACT

An aquaculture system comprising a water retaining aquaculture vessel with a bottom wall and side walls along with an air lift system being provided for aerating the water. Particulate material is removed from the bottom of the vessel through conventional extraction apparatus. In addition, a plurality of discrete open-cell foam substrate members are provided with substantial surface contact area for substantially continuous circulation through the aquaculture vessel, with the substrate members comprising an open cell foam member having a density of between about 1.1 to 1.7 pounds per cubic foot, and fabricated from a matrix material having a specific gravity of between about 1.8 and 2.2. The surface area as well as the bulk of the foam substrate members have typically between about 25 and 100 individual cells per inch. The aquaculture vessel is provided with water recirculation as well as introduction of oxygen into the water through recirculation or recycling of the foam substrate members. A filtration system is interposed in the water recirculation system in order to trap, isolate, and otherwise separate solid debris in the form of fecal material or the like from the recirculating (recycled) water.

6 Claims, 3 Drawing Sheets

AQUACULTURE SYSTEM

BACKGROUND OF THE INVENTION

The present invention relates generally to an improved aquaculture system, and more particularly to an aquaculture system which is designed for raising of fish and/or other marine life, and more particularly to such a system which is designed for substantially continuous operation with a single tank means, and without requiring separate vessels for clarification and/or digestion. The system of the present invention utilizes a plurality of discrete foam substrate members which are recirculated through the vessel on a substantially continuous basis. Means are provided for removal of solid waste products from the vessel, as well as from the surface of the discrete foam substrate members.

Aquaculture is a rapidly expanding and widening industry. The growth of this industry is in response to increasing demands for protein, and including an increasing demand for fish and other marine animals as a source of either food or brood stock. In addition, aquaculture has expanded in response to concerns over quality of the harvest for use as food due to possible harmful effects of pollution of the lakes, seas and oceans, and also due to concerns of over-harvesting of available current resources. Aquaculture provides a relatively safe and continuous source of supply for fish and other marine life for either food or brood stock purposes.

Consumer demand for fish, seafood and the like is increasing rapidly. Because of concerns for over-harvesting of certain species of fish, new sources other than natural habitat such as lakes, seas and oceans must be found to satisfy the ever-increasing demand for the more desirable species. Aquaculture may be the means by which the supply of seafood may be appropriately increased or at least maintained and thus endeavor to meet the demand.

In the past, aquaculture systems have typically utilized a plurality of large vessels for raising fish to mature and suitable sizes. Typically, the systems include a vessel where the fish are housed, with additional vessels being utilized for treatment of the water, including additional vessels used for operations such as water clarification and waste digestion. These vessels are employed so as to reduce concerns related to over-consumption of water, as well as the creation of a possible source of pollution with the used water. The present invention provides improvements in aquaculture systems wherein a single vessel is employed and the water is being constantly treated so as to maintain its suitability for the purpose including the maintenance of properties, an appropriate oxygen content or concentration, as well as an appropriate and consistent level of purity and clarity. In the present arrangement and system, the fish are able to grow and mature, and are also able to do so within a healthy, sound, and tolerable environment.

The system of the present invention is of the closed/recirculating type. It has been found that closed/recirculating systems reduce the quantity of water employed, and accordingly reduce the release of any harmful effluent or waste products. These advantages are available over both single-pass aquaculture systems and pond culture systems. The production of closed/recirculating systems has been found to provide a higher quality as well as a more uniform quality of product, in addition to the reduction of water-borne contaminants. In the past, attempts have been made to produce fish and other marine animal life in closed/recirculating aquaculture systems. Normally, however, these have been undertaken as incremental enhancements of natural systems. Also, attempts have been made to improve the quality of pond cultures through oxygenation of the water, recirculation of the water, as well as purification of the water. Generally, however, these enhancements have added substantially to the cost of the system, and hence have also contributed to an increase in product production costs.

SUMMARY OF THE INVENTION

Briefly, and in accordance with the present invention, a closed aquaculture system is provided which includes a water retaining aquaculture vessel having a bottom wall and side walls along with an in-place means for aerating the water contained within the top of the vessel. While the term "side walls" has been employed, it is contemplated that a cylindrical tank may be utilized with a conventional continuous round configuration, thus the term "side walls" is used in a comprehensive sense. In the preferred embodiment, the means at the top of the vessel for aerating the water comprises an inverted cone arranged to carry and otherwise support the filtering mechanism. A circulating media in the form of open-cell foam spheres (or other convenient configuration) are employed to continuously provide oxygen to the water contained within the system. Furthermore, a thin film adaptation for raising tiny fish (fry) may be utilized which employs a structure similar to the film, line, or other surface-creating structures may be utilized.

The inverted cone utilized to carry the filtering mechanism is provided with slits on the upper sloped surface so as to allow water from the aquaculture system to pass therethrough. Means are provided to filter the water passing through the system, and also to separate the water from the individual open-cell spheres forming the circulating media. Debris from the surface of the open-cell foam is trapped within the filter media and hence is separated from the recirculating water of the aquaculture system.

In the system, the open-cell spherical members are provided for removing particulate material from the vessel, normally from the lower zone or bottom of the vessel. The present system comprises the provision of a plurality of these discrete open-cell foam substrate spheres or members being included in the vessel. These discrete foam substrate members provide substantial surface contact area for nitrification, an important process in aquaculture systems. This reduces the quantity of harmful or poisonous effluent which may otherwise be released as a waste product, and also enhancing the conditions for aquatic growth within the system. The aquaculture system of the present invention preferably includes an air lift mechanism for periodically and temporarily removing individual discrete foam substrate members from the aquaculture vessel, with waste removal and air entrapment being achieved during the time of removal. The air lift mechanism reduces the likelihood of damage to the fish or other marine life contained within the aquaculture system, with the fish being gently returned to the vessel by means of sliding down the outer surface of the inverted cone forming the top of the vessel. Filtration means are provided for retention of solid waste products, with the effluent being thereupon permitted to return to the aquaculture vessel.

A number of parameters are important, if not critical, in aquaculture operations. For example, the oxygen level in the water medium must be maintained at a level sufficiently high so that the fish will not become either unusually stressed, stunted in growth, or perhaps ultimately perish. For certain species, this minimum oxygen level is not significantly below oxygen saturation levels at the temperatures utilized.

It is also important that water temperature be maintained at an appropriate level. It has been found over the years that the best temperature for fish growth is approximately 50 degrees F. and may exist within a range of from 50 degrees F. to 65 degrees F., with a top of 60 degrees F. being desired for certain species. Some species may tolerate higher temperatures, such as temperatures of up to about 80 degrees F. While growth rates are increased at temperatures significantly above about 50 degrees F., problems may arise due to increased contamination and accordingly disease in the fish population. Temperatures below about 50 degrees F. have been found to cause the fish to mature at a much slower rate than is desirable.

In addition to the removal of excess food particles, waste products including metabolic wastes must be removed from the system. Furthermore, toxic waste products such as ammonia are necessarily removed, primarily by conversion of the toxic ammonia fish waste to a harmless nitrate. One means of converting the ammonia to a harmless nitrate is through the provision of adequate surface area for accommodating the conversion reaction. The system of the present invention employs a number of discrete open-cell foam substrate members which are effective in providing a high level of substrate surface area for utilization by bacteria, with the area available from the foam substrate members comprising a biological digester for this conversion process to take place.

With respect to the possible accumulation of particulate matter, including excess food particles and metabolic waste, a problem arises with respect to oxygen demand. Furthermore, bacteria may accumulate along with excess food particles and solid metabolic waste products. Thus, it is well understood that such materials must be removed from the aquaculture system in order to maintain an appropriate environment for fish being retained and maturing therewithin.

Therefore, it is a primary object of the present invention to provide an improved aquaculture system of the closed/recirculating type which provides for continuous treatment of the retained water, along with continuous removal and/or separation of solid waste products.

It is a further object of the present invention to provide an improved aquaculture system which employs a number of discrete open-cell foam substrate nitrification members for use within the system, with the nitrification members being employed to assist in the preservation of water quality through removal of solid waste from the system, along with the enhancement and maintenance of appropriate oxygen content within the water retained in the vessel.

It is yet a further object of the present invention to provide an improved recirculating/closed aquaculture system which employs a plurality of discrete open-cell foam substrate nitrification members which are passed through the system at a rate sufficient to accommodate and achieve nitrification of the waste products contained within the retained water, and with means also being provided for the continuous and temporary removal of such substrate members from the system for the purpose of solid waste removal, and addition of entrapped ambient air.

Other and further objects of the present invention will become apparent to those skilled in the art upon a study of the following specification, appended claims, and accompanying drawings.

IN THE DRAWINGS

Figure 1:
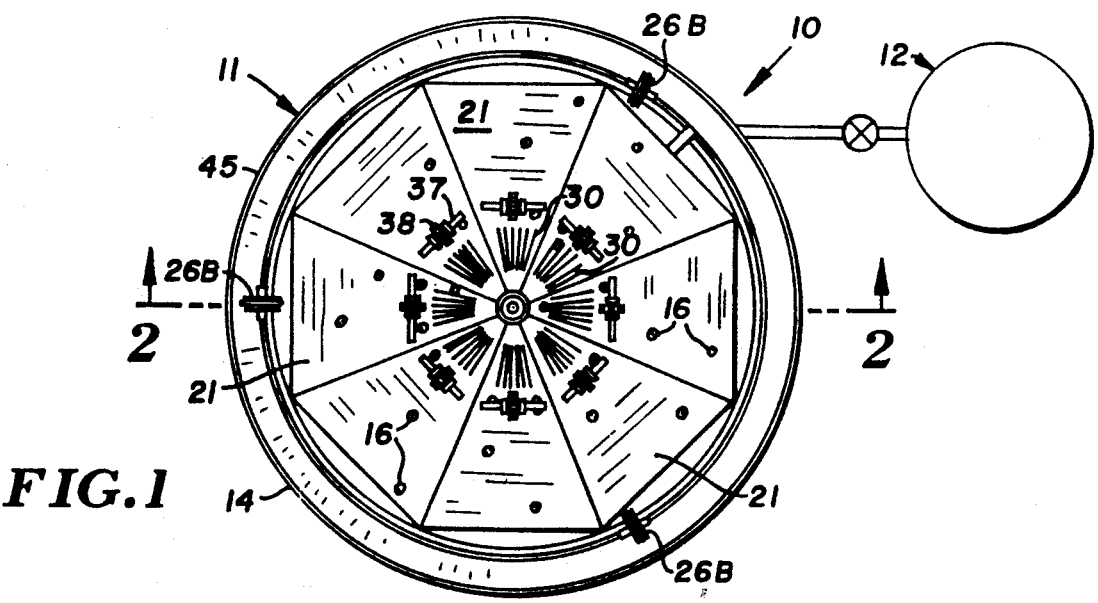
FIG. 1 is a schematic view, on a top plan view basis, and illustrating a typical aquaculture system incorporating the improved vessel-media circulating system of the present invention, and showing the mechanism for transferring solids out from the aquaculture vessel to a solids collection vessel, with the transfer being undertaken on an intermittent basis.
Figure 6:
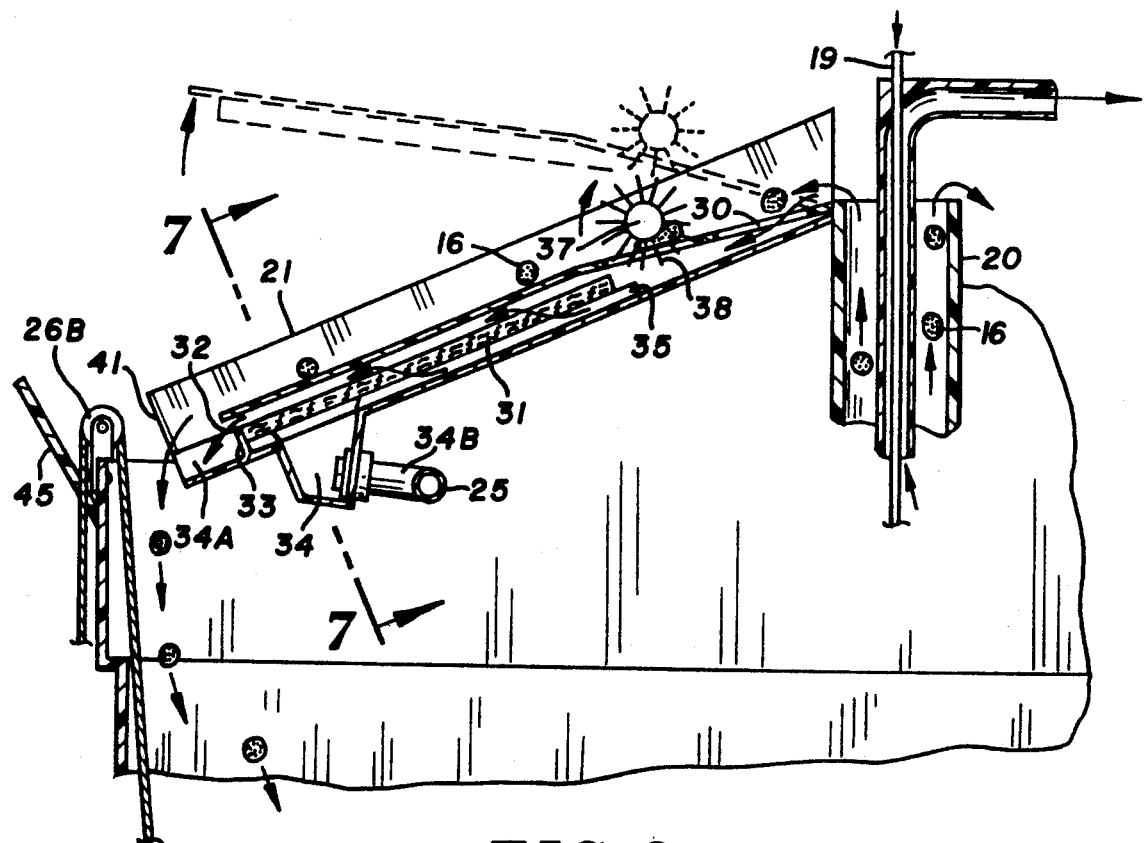
Figure 7:
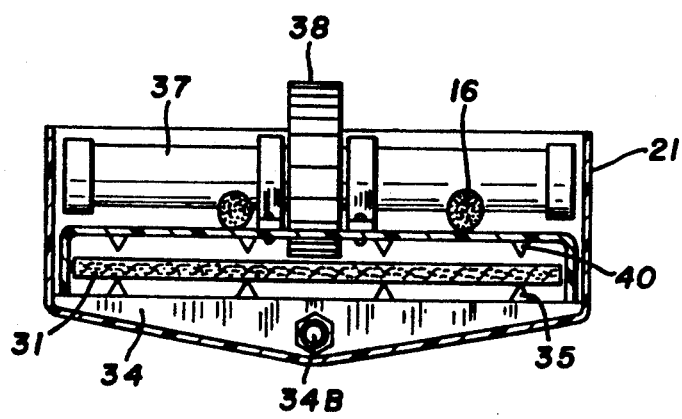

FIG. 6 is a side elevational view of a typical means for squeezing water from open-cell foam substrate members, with the device of FIG. 6 normally being disposed at the top of the vessel, and with the aqueous material being returned to the system and with contaminants being removed as illustrated in FIG. 1; and FIG. 7 is a sectional view taken along the line and in the direction of the arrows 7—7 of FIG. 6, and illustrating the manner in which individual foam substrate members are compressed for compressing water therefrom.

DESCRIPTION OF THE PREFERRED EMBODIMENT

Figure 2:
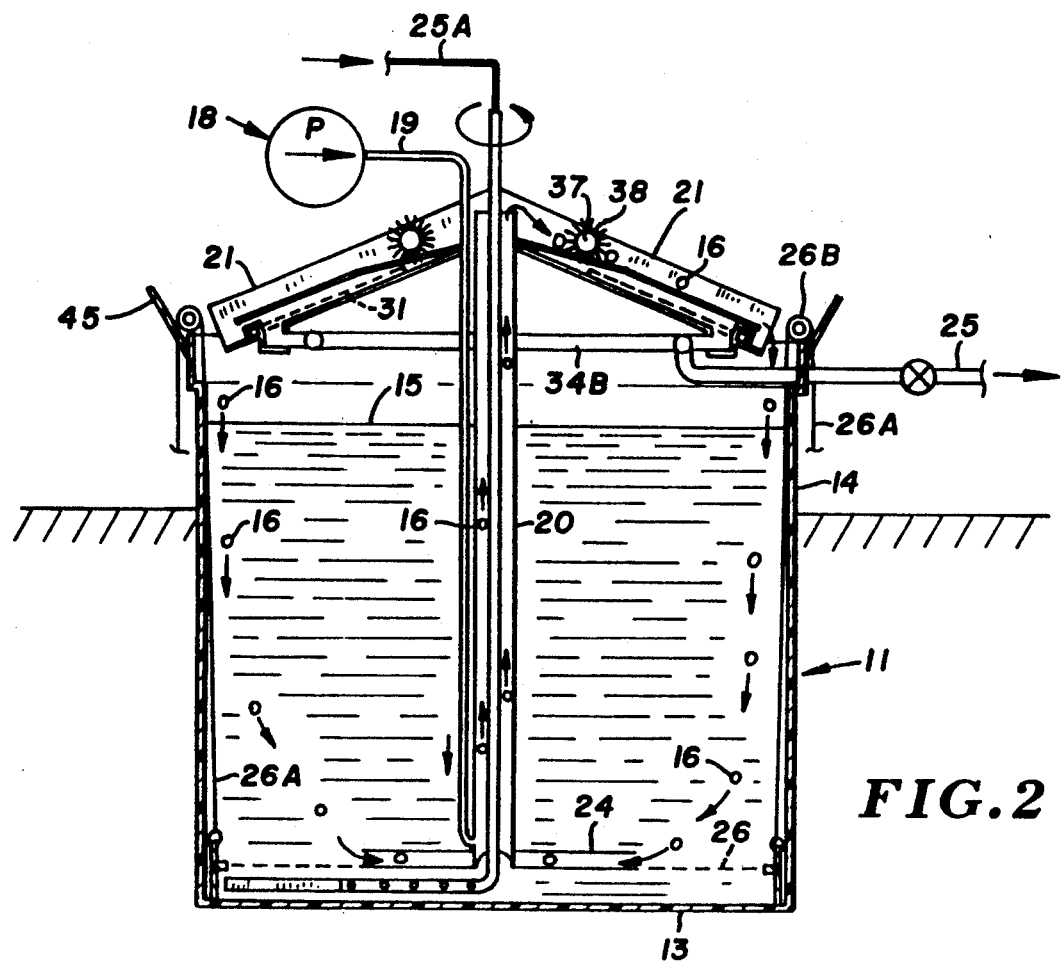
FIG. 2 is a side elevational view of a typical aquaculture system shown partially buried within the earth so as to assist in maintaining temperature stability.

In accordance with the preferred embodiment of the present invention, and with particular attention being directed to FIGS. 1 and 2 of the drawings, it will be observed that the aquaculture system generally designated 10 includes a water retaining aquaculture vessel generally designated 11 along with a solids collecting vessel 12. The vessel 11 is provided with a bottom wall as at 13 and a circular side wall as at 14. Means are provided for aerating the water contained within the vessel, such as water shown beneath the upper level 15. Water is aerated (oxygenated) by means of the suspension of discrete open-cell foam substrate nitrification members as at 16—16 within the vessel, along with the treatment of these substrate members, as will be explained in greater detail hereafter, being undertaken on a substantially continuous basis. Air is introduced into the system through air pump generally shown at 18, including inlet conduit 19 and lift conduit 20, with the air pump system providing a means for gently lifting and recirculating, on a substantially continuous basis, the discrete open-cell foam substrate nitrification members 16—16 contained within the vessel. As is indicated in FIG. 1, a number of the open-cell foam substrate members 16—16 are being treated and temporarily retained on the generally triangularly shaped gore elements or surfaces 21.

Figure 3:
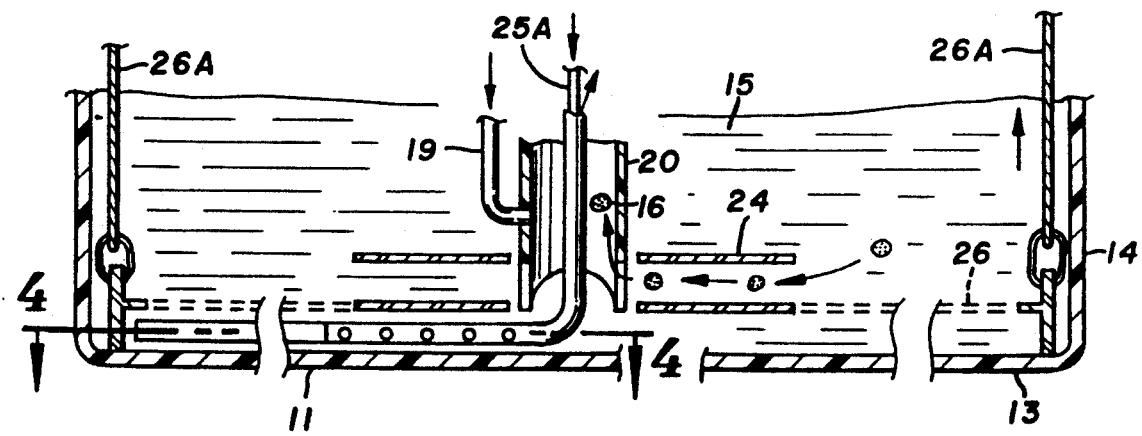
FIG. 3 is a fragmentary detailed view of a portion of the bottom of the vessel illustrated in FIG. 1, and showing, on a slightly enlarged scale, the detail of the air lift pumping mechanism.
Figure 4:
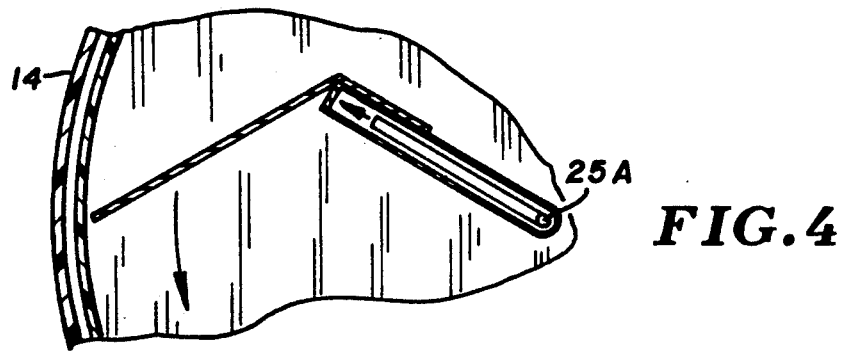
FIG. 4 is a horizontal sectional view taken along the line and in the direction of the arrows 4—4 of FIG. 3, and illustrating a section taken through the sweep mechanism for assisting in the removal of solid particulate matter from the bottom or base of the vessel.

With attention also being directed to FIGS. 3 and 4 of the drawings, in a typical operation, the individual foam substrate nitrification members 16—16 are introduced into the vessel at the top, as illustrated in FIG. 2, and thereupon being permitted to drop by means of gravity through the vessel, and ultimately collect adjacent the bottom, including the screened false bottom area as at 24. The false bottom area is perforated at its outer annular edge so as to prevent and/or reduce the introduction of live fish into the pump area. Because of the utilization of the air pump in the system, live fish may pass through the system and be returned after passing along the surface of the top of the vessel as shown in FIG. 2 at 21. Drain conduit 25 may be utilized for periodically exhausting waste products which collect beneath false bottom 24 and vessel bottom 13, with such removal being undertaken in a manner well known in the art. Air for the removal of particulate material from the base, is provided as an inlet for the sweep as shown at 25A. In order to isolate the sweep area from the remaining portion of the interior of the vessel, a fish guard is provided, as illustrated in broken lines as at 26, with the elevation of the fish guard being controlled by line 26A passing over pulley 26B.

Figure 5:
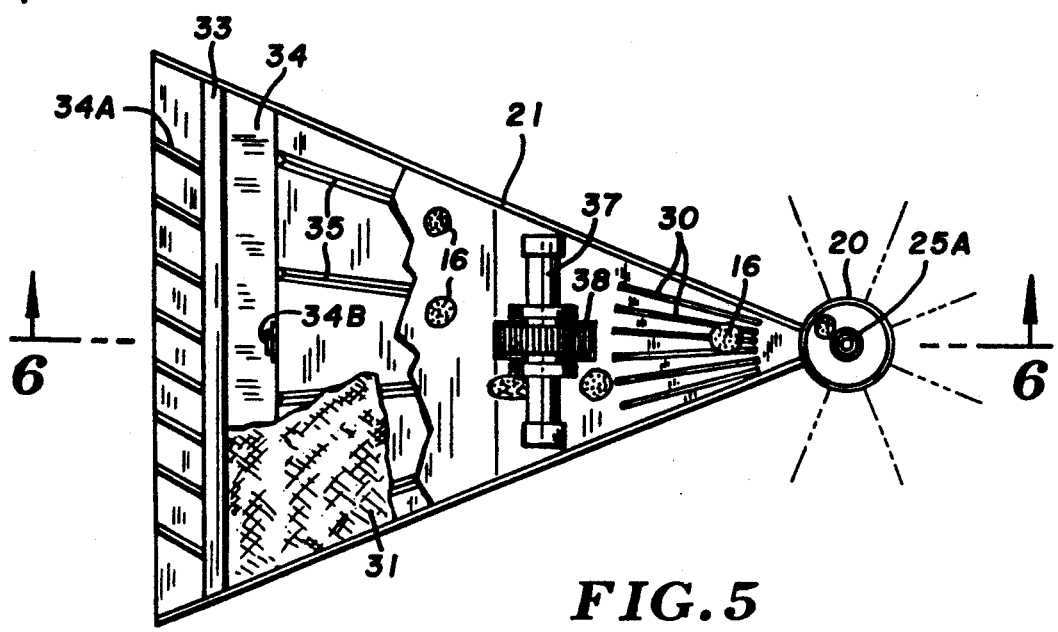
FIG. 5 is a top plan view of one of the segments or gores of the inverted conical top of the vessel utilized for removal of water and contaminants from the vessel.

With continuing attention being directed to FIG. 1, and with further attention being directed to FIGS. 5, 6 and 7, it will be observed that the individual triangular gore members 21—21 are provided with slots 30—30 in the upper surfaces for permitting return of water into the confines of vessel 11. For example, water flows through the slits 30—30 from the water carried by the air pump (see FIG. 6) as well as from the water extracted from the individual open-cell foam substrate nitrification members 16—16. After passing through the slits 30—30, water passes through the filter media member 31, and thereafter along the path shown by arrow 32 over weir member 33. Vane 34A is provided to control the flow of water back into the vessel 11. Solid material which is collected on the base or underside of filter 31 is periodically separated from the water contained within the vessel through trough 34 and ultimately through stub line 34B and into drain conduit 25. Individual support fins are provided as at 35 to support the underside of filter 31, and thereby provide an ongoing flow channel for water entering the filtration system through slits 30—30. In addition to slits 30—30, openings of other configurations may be employed as well.

The individual open-cell substrate nitrification members 16—16 are squeezed in order to express retained water therefrom. A roller member 37 is typically provided, with external fins, parallel to the axis of roller 37, being provided to rotate roller 37 on the basis of a paddle wheel drive. Typical drive fins are illustated at 38—38. In this fashion, the individual support fins 35—35 are arranged in generally parallelly disposed fashion so as to permit passage of water therealong. Additionally, downwardly projecting or extending fins 40—40 are provided in order to keep the filter pad from being forced under surface of member 32. Fins 5—35 and 40—40 are preferably molded into the members which may typically and advantageously be fabricated of fiberglass.

Means, such as gate 41, may be employed to assist the periodic maintenance of the filter 31 by controllably opening and closing gate 41. Filters such as filters 31 may be intermittently and periodically back-flushed in order to clean the same of collected/separated debris, with the discharge from the periodic cleaning normally being passed through conduit 25 for ultimate disposal, preferably after treatment so as to render the material proper and appropriate for disposal. Such post-treatment is taken in a vessel such as vessel 12 illustrated in FIG. 1.

As illustrated in FIG. 6, the individual triangular shaped gore elements as shown at 21—21 may be pivotally secured to the tank or vessel adjacent the inner end thereof, and lifted to expose the filter for cleaning, such as in the manner illustrated in phantom in FIG. 6. In the operation of the system, individual segments may be lifted periodically for filter cleaning without disturbing the overall operation of the remaining portions of the system. In other words, the system may be operated continuously and maintained on an intermittent basis without adversely affecting the quality of the water maintained within the aquaculture system.

In order to maintain an appropriate oxygen content or concentration within the water, the individual open-cell foam substrate nitrification members are intermittently and periodically squeezed, as illustrated in FIGS. 5-7, in order to express water and debris therefrom. In the arrangement illustrated, the individual open-cell foam members 16—16 are passed beneath pressure roller 37. Water expressed therefrom may be discharged through slits 30—30 as indicated, with the individual open-cell substrate members being permitted to fall by gravity and return to vessel 11.

THE FOAM SUBSTRATE NITRIFICATION MEMBERS

The open-cell foam substrate nitrification members function both as a means to provide a surface upon which nitrification of metabolic waste may occur, as well as a continuous source of replenishing oxygen for the water. A material which has been found suitable for this purpose is a frothed open-cell foam having a density of between about 1.1 and 1.7 pounds per cubic foot, with the material having been fabricated from a matrix having a specific gravity of between about 1.8 and 2.2. The surface area of the discrete foam nitrification/oxygenation substrate members is preferably between about 36 and 45 cells per inch. Such foams are commercially available, and preferably fabricated from foamed polyurethane. Such substrate materials may, in certain instances, be referred to as "Nerf" balls. Typically, the substrate materials are comprised of an open-cell foam product with pores or cells contained therein at a density of about 100 cells per lineal inch. It will be appreciated that the number of individual cells per inch may vary between about 25 and 100 cells per inch, with these cells being measured on a lineal basis and being uniformly dispersed throughout the bulk of the substrate. If desired, the surfaces of the foam substrate nitrification-/oxygenation members may be treated with a material such as chitosan or bentonite. Optionally, the surface of the members may be treated with materials for enhancing fish growth, as well as other substances having an affinity for the open-cell foam product so as to expedite, or accelerate, or otherwise encourage growth. Antibiotics or antigens may also be utilized to improve the performance of the materials. Also, alum, the chemical symbol or name for a substance known as potash alum, one example of which is potassium aluminum sulfate, hydrated with 12 mols of water may be employed as a clarifier. Such materials are commonly employed as clarifier substances. This clarifier may be blended with isocyanate spheres to assist in the precipitation of phosphates from the water.

THE AIR PUMP

The air pump provides additional oxygenation of the water within the vessel, and also acts as a pump to move spent foam substrate nitrification/oxygenation members from the bottom of the vessel up through the recycling mechanism. The air pump includes a conduit such as the conduit means 18, having an inlet adjacent the bottom walls of the vessel and an outlet adjacent the top of the vessel. A source of supply air enters the conduit 19 adjacent the inlet and is arranged for discharge at the upper end for substantially continuously recycling the discrete open-cell foam substrate nitrification/oxygenation members for upward passage through conduit 20 and for discharge at the upper end onto the filtration and solid separation means.

In actual operation, the individual open-cell foam substrate nitrification/oxygenation members enter the vessel at the top surface, take on water, while at the same time discharging and transferring entrapped air and oxygen into the water. While suspended, they drop down slowly because of the specific gravity of the raw material and while so doing, contribute to a rather complete nitrification of the toxic amine wastes. Ultimate conversion of the amines results in creation of harmless nitrates. In this operation, the individual open-cell foam substrates (preferably in the form of small spheres) will coagulate proteinaceous material, and accumulate and otherwise remove colloidal wastes as well as dissolved organic substances.

While air will normally provide a sufficient quantity of oxygen for the fish in the vessel, it occasionally may be desirable to utilize oxygen enriched air. In such an instance, the portion of the apparatus illustrated in FIG. 2 may be enclosed within an atmosphere retaining vessel, and oxygen enriched air may be present within the confines of the vessel. For normal operations, however, oxygen is reasonably available from the ambient.

Also of interest is the provision of a fish guard as at 45, and illustrated in detail in FIG. 6. Fish guards are employed to more effectively transfer small fish that enter the air lift system for safe and non-damaging return to the vessel.

OPERATION OF THE SYSTEM

In a typical operational system, a vessel such as vessel 11 is filled with an appropriate quantity of water, approximately 5100 gallons, with the amount of fill being controlled by a typical float valve. Following introduction of the fish or other marine life to be supported within the aquaculture system, the operation proceeds normally through control of liquid levels as well as control of food and other components necessary for the species.

In this system, a number of approximately 3000 open-cell foam substrate members are added, with each such foam member having a diameter of 2.5 inches. Water is circulated through the air pump for separation of solids in the system installed on the inverted conical top, with a flow through the system of approximately 200 gallons per minute being deemed appropriate. The open-cell foam substrate members are thereupon separated from the vessel, with approximately 96 percent of the open-cell foam substrate members being retained within the aquaculture vessel per se.

The open-cell foam substrate members have a density of 77 pounds per cubic foot, with a cell density of approximately 40 cells per lineal inch. Such cells are deemed appropriate for utilization in the system disclosed herein.

It will be appreciated that other and further modifications may be made of the apparatus of the present invention without departing from the spirit and scope of the present invention, it being understood that the illustrations provided herein are for purposes of familiarizing those skilled in the art with the concept of the present invention.

What is claimed is:

1. In an aquaculture system comprising a water retaining aquaculture vessel with a bottom wall and side walls, means for aerating the water within said vessel, and means for removing particulate material from the bottom of said vessel, the improvement comprising the provision of a plurality of discrete foam substrate nitrification members with substantial surface contact area for substantially continuous circulation through said culture vessel, said discrete foam substrate members comprising:

(a) a generally frothed, open-cell foam member having a density of between about 1.1 and 1.7 pounds per cubic foot, and fabricated from a matrix material having a specific gravity of between about 1.8 and 2.2 and with the surface area and bulk of said discrete foam nitrification substrate members having between about 25 and 100 cells per lineal inch dispersed therein;

said system further comprising:

(b) means for recirculation of water within said vessel;
  (c) means for introduction of oxygen into water within said vessel through said discrete foam substrate members and including means for separating water and waste product from said members while exposed to the ambient and filtration means for separating mature bacterial growth from said foam substrate members; and
  (d) air pump means within said vessel including conduit means having an inlet adjacent the said bottom walls of said vessel and an outlet adjacent the top of said vessel, a source of supply air entering said conduit means adjacent the inlet and arranged for discharge at the upper end thereof for substantially continuously receiving said discrete foam substrate members from said inlet and for upward passage through said conduit means and for discharge at the upper end thereof onto said filtration means.

2. The system as defined in claim 1 being particularly characterized in that means are provided adjacent said filtration means for expelling water from said discrete foam substrate members.

3. The system as defined in claim 1 being particularly characterized in that means are provided for maintaining the pH of said culture medium between about 5.5 and 8.

4. The system as defined in claim 1 being particularly characterized in that means are provided for maintaining the temperature at a range of between about 50 degrees F. and 60 degrees F.

5. The system as defined in claim 1 being particularly characterized in that means are provided for maintaining the culture oxygen content above 5 parts per million.

6. The system as defined in claim 1 being particularly characterized in that said foam substrate members have between about 36 and 45 cells per inch.

* * * * *